(12) United States Patent
Takaai et al.

(10) Patent No.: US 7,703,001 B2
(45) Date of Patent: Apr. 20, 2010

(54) MEDIA STORING A PROGRAM TO EXTRACT AND CLASSIFY ANNOTATION DATA, AND APPARATUS AND METHOD FOR PROCESSING ANNOTATION DATA

(75) Inventors: Motoyuki Takaai, Kanagawa (JP); Hitoshi Abe, Tokyo (JP); Naoyuki Egusa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 875 days.

(21) Appl. No.: 11/178,979

(22) Filed: Jul. 11, 2005

(65) Prior Publication Data

US 2006/0224950 A1 Oct. 5, 2006

(30) Foreign Application Priority Data

Mar. 29, 2005 (JP) ............................. 2005-093470

(51) Int. Cl.
*G06F 17/00* (2006.01)
(52) U.S. Cl. ...................... 715/232; 715/230; 715/231; 715/268
(58) Field of Classification Search ......... 715/230–233, 715/255, 268
See application file for complete search history.

(56) References Cited

U.S. PATENT DOCUMENTS 7,158,675 B2 * 1/2007 Gounares et al. ............ 382/187

| | | | |
|---|---|---|---|
| 2002/0010707 A1* | 1/2002 | Chang et al. | 707/500 |
| 2002/0052888 A1* | 5/2002 | Sellen et al. | 707/500 |
| 2002/0102022 A1* | 8/2002 | Ma et al. | 382/170 |
| 2003/0204490 A1* | 10/2003 | Kasriel | 707/2 |
| 2004/0032428 A1* | 2/2004 | Pilu et al. | 345/764 |
| 2004/0139391 A1* | 7/2004 | Stumbo et al. | 715/512 |
| 2004/0237033 A1 | 11/2004 | Woolf et al. | |
| 2004/0252888 A1* | 12/2004 | Bargeron et al. | 382/188 |
| 2005/0041834 A1* | 2/2005 | Wakeam et al. | 382/100 |
| 2005/0289452 A1* | 12/2005 | Kashi et al. | 715/512 |
| 2006/0017989 A1* | 1/2006 | Matsunoshita et al. | 358/540 |
| 2006/0291727 A1* | 12/2006 | Bargeron | 382/218 |

FOREIGN PATENT DOCUMENTS

| | | |
|---|---|---|
| JP | 2000222394 | 8/2000 |
| JP | 2002319025 | 10/2002 |
| JP | 2003037677 | 2/2003 |
| JP | 2004112524 | 4/2004 |

OTHER PUBLICATIONS

Office Action issued on Aug. 15, 2008 from the Chinese Patent Office for corresponding Chinese Patent Application Serial No. 200610008554.1, with English translation.

* cited by examiner

*Primary Examiner*—Thu Huynh
(74) *Attorney, Agent, or Firm*—Gauthier & Connors LLP

(57) ABSTRACT

A storage medium readable by a computer stores a program of instructions executable by the computer to perform a function. The function comprises comparing input image data with reference image data, extracting an annotation contained in the input image data based on a result of comparing, discriminating a geometry of the annotation, and classifying the annotation according to the geometry of the annotation.

10 Claims, 13 Drawing Sheets

MEDIA STORING A PROGRAM TO EXTRACT AND CLASSIFY ANNOTATION DATA, AND APPARATUS AND METHOD FOR PROCESSING ANNOTATION DATA

PRIORITY INFORMATION

This application claims priority to Japanese Patent Application No. 2005-093470, filed Mar. 29, 2005 which is incorporated herein by reference in its entirety.

BACKGROUND OF THE INVENTION

1. Field of the Invention

The present invention relates to a technology of electronically processing an annotation handwritten on paper, and more particularly to a technology of processing an annotation according to geometric properties thereof.

2. Description of the Related Art

An annotation is often handwritten on a paper material, such as a document or a drawing, in order to record notes, correct description in the document, or for other purposes. Although such a handwritten annotation is perhaps usually intended for personal use only, there are times when a person may wish to share the annotation with other people, depending on the nature of the document and the purpose of the annotation. For example, if presentation materials displayed at a conference are printed and distributed to participants in the conference, participants may make annotations on the distributed presentation materials. In such cases, it can be of great benefit to share the annotations among the participants.

As one example, the shared use of handwritten annotations is enabled by handling the handwritten annotations on a document converted into electronic form by scanning of the document. Handwritten annotations, however, have a wide variety of geometries, sizes, and locations, which can pose a problem in that handwritten annotations are more difficult to handle than are electronically input annotations. Therefore, handwritten annotations are usually personally kept by each of the participants and not effectively shared among the participants.

For example, in the case of the above-described conference materials, because annotations are often written in the margin of the conference materials, a document portion originally contained in the conference materials must be scaled down to entirely display scanned conference materials on the screen. Further, in such conference materials, multiple participants can make annotations simultaneously on different sheets of the conference materials. If these multiple pages are simply scanned, plural independent files would be created without any link organically connecting the files. Under these circumstances, it is difficult to share the personally-made annotations among the participants. In addition, there is another problem that no adequate scheme has yet been established for handling a situation where a personally-made annotation is not wanted to be disclosed to public.

SUMMARY OF THE INVENTION

A storage medium readable by a computer stores a program of instructions executable by the computer to perform a function comprising comparing input image data with reference image data, extracting an annotation contained in the input image data based on a result of comparing, discriminating a geometry of the annotation, and classifying the annotation according to the geometry of the annotation.

An annotation data processing apparatus comprises a comparing unit that compares input image data with reference image data, an extractor that extracts an annotation contained in the input image data based on a result of comparing, a discriminating unit that discriminates a geometry of the annotation, and a classification unit that classifies the annotation according to the geometry of the annotation.

An annotation data processing method executable by a computer comprises comparing input image data with reference image data, extracting an annotation contained in the input image data based on a result of comparing, discriminating a geometry of the annotation, and classifying the annotation according to the geometry of the annotation.

BRIEF DESCRIPTION OF THE DRAWINGS

Preferred embodiments of the present invention will be described in detail based on the following figures, wherein.

DETAILED DESCRIPTION OF THE INVENTION

Preferred embodiments of the present invention will be described below with reference to an example in which the invention is used in conjunction with notes taken during a conference as described above.

Figure 1:
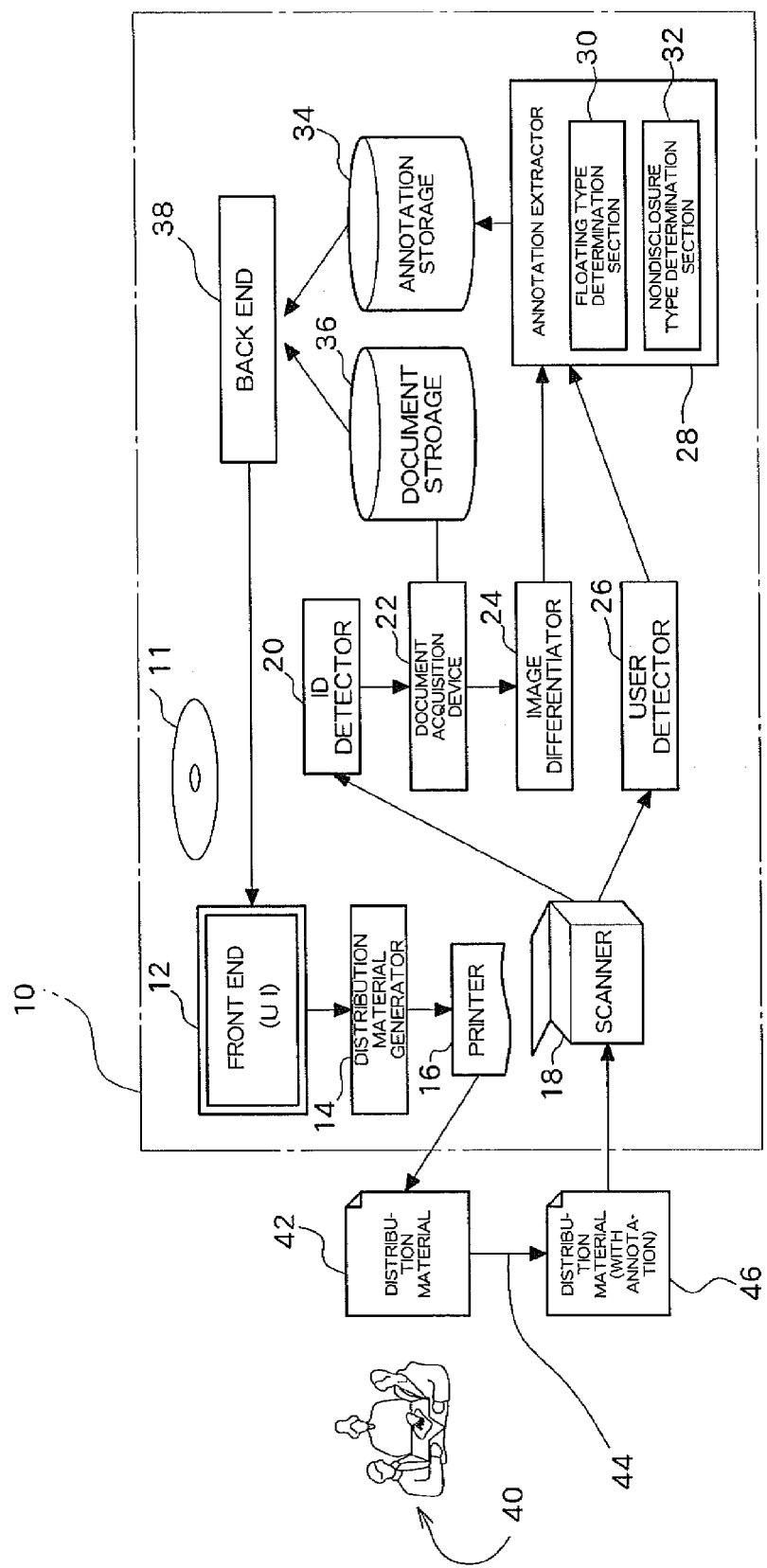
FIG. 1 is a block diagram showing an example of an apparatus configuration according to an embodiment of the present invention.

FIG. 1 schematically shows the configuration of an apparatus according to the present embodiment. In FIG. 1, main constituent components including a computer system 10, a user 40, and distribution materials 42 and 46 are depicted. The computer system 10 is configured with a hardware group including a personal computer and peripheral equipment, and software (a program) which controls operation of the hardware group. In the present example, the user 40 is, in addition to being an operator and a user of the computer system 10, a participant in a conference. The distribution material 42 is a document output by the computer system 10 and distributed to the user 40 at the conference. The user 40 makes annotations on the distribution material 42, to thereby create the distribution material 46 which is read and electronically processed by the computer system 10.

The computer system 10 typically reads a program from a recording medium 11 and operates according to the instructions contained in that program. The computer system 10 includes a front end 12 which is typically configured with hardware including a display device and user input device, a GUI (graphical user interface) represented on the display device and operated by input from the user input device, and other components.

A distribution material generator 14 operates according to a user instruction through the front end and a program to convert image data (an image file) for use in presentation previously input into printing image data. In a conversion process, it is possible to perform processing to merge multiple pages of original image data into one page (so-called N-up processing); processing to add participant's names and participant check boxes when participants in the conference are previously known; processing to assign a file ID which identifies a file name, a page number, or the like of the printing image data generated or the original image data; or other processing. The distribution material generator 14 sends the generated printing image data to a printer 16 and causes the printer 16 to print the distribution material 42.

To convert the annotations handwritten on the distribution material 46 into electronic form, the user 40 uses a scanner 18 to scan distribution material 46 and generate input image data. The input image data generated is sequentially processed through an ID detector 20, a document acquisition device 22, and an image differentiator 24. More specifically, the ID detector 20 detects the file ID in the input image data generated, and the document acquisition device 22 retrieves the printing image data based on the file ID detected by the ID detector 20. The printing image data is reference image data including no annotations, while the input image data is data including an annotation. Then, the image differentiator 24 compares the printing image data with the input image data to find a difference between them and generates difference image data including a set of handwritten annotations. Further, a user detector 26 reads a name of participant and a check mark entered in a field of check box in the input image data to identify a user to whom the input image data associated with the distribution material 46 belongs.

An annotation extractor 28 receives the difference image data from the image differentiator 24, obtains user identification results from the user detector 26, and then extracts annotations from the difference image data in addition to linking the difference image data with the user. Extraction of annotations can be performed using image analysis, such as, for example, processing to divide the difference image data into clusters of image patterns. The annotation extractor 28 is equipped with a floating type determination section 30 and a nondisclosure type determination section 32 to classify the annotations into categories based on geometries of annotation. The floating type determination section 30 determines whether or not the extracted annotation is of a floating type which has a symbol pointing at a specific place, and the nondisclosure type determination section 32 determines whether or not the extracted annotation includes a mark indicating nondisclosure of the annotation. Data of the annotations classified according to determined results is stored in an annotation storage 34.

The annotation storage 34 is configured with a data storage device, such as a hard drive. In the storage device, there is formed a document storage 36 containing the original image data and the printing image data. The image data stored in the storage device is read out by a back end 38 which is a device designed for performing display operation based on data accumulated in the annotation storage 34 and the document storage 36. According to an instruction from the front end 12, the back end 38 displays the annotation on an image according to the original image data.

Figure 2:
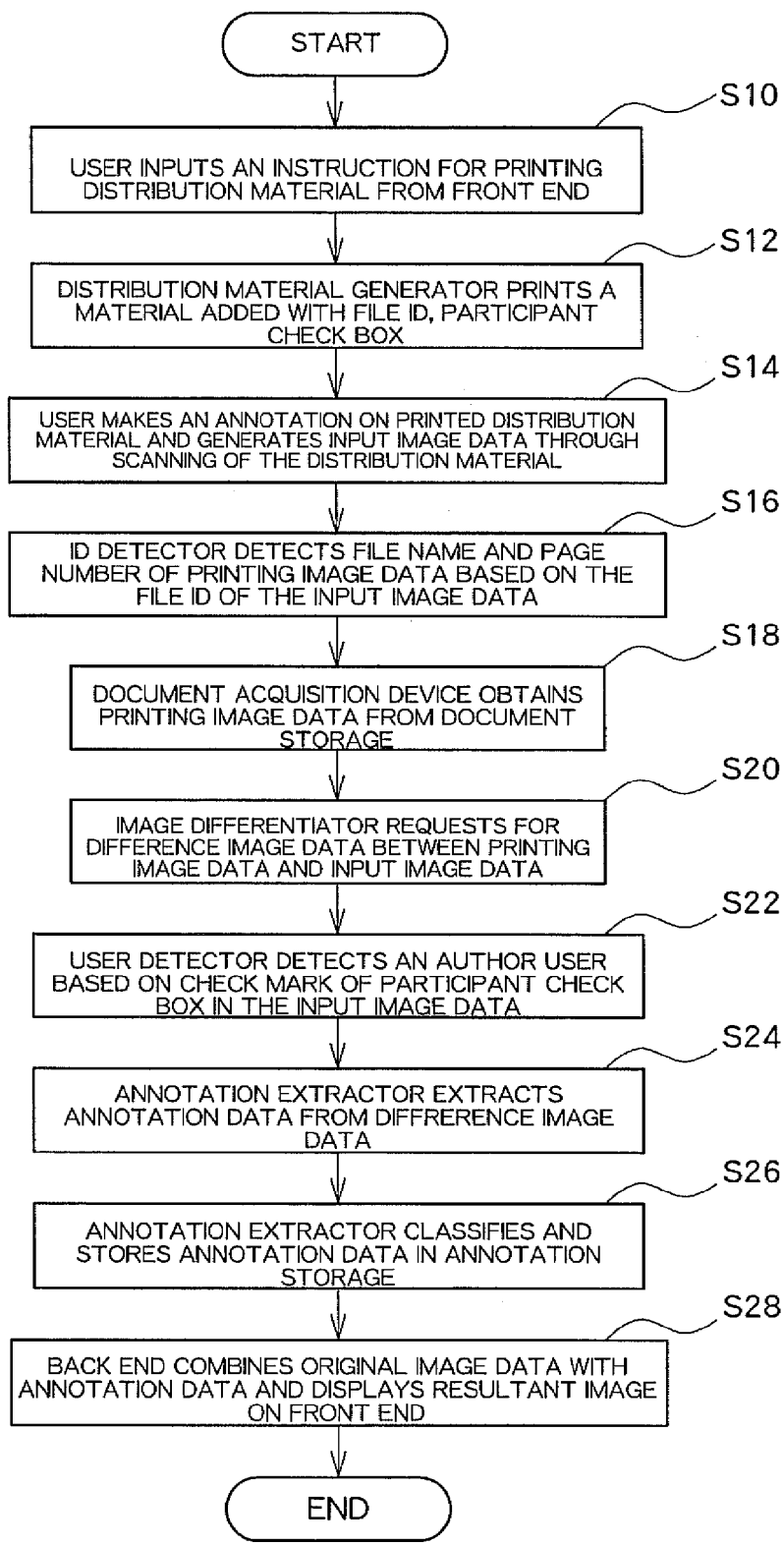
FIG. 2 is a flowchart depicting overall processing.

Referring now to a flowchart shown in FIG. 2, operation flow of the computer system 10 will be described. For a conference, the user 40 operates the front end 12 to print the distribution material 42 (S10). The distribution material 42 is a presentation material printed on a paper medium to be viewed on a display (such as a liquid crystal display, a projector screen, or the like) at the conference. The presentation material is independently entered into the computer system 10 by the user 40 and stored as original image data in the document storage 36. Generally, the distribution material 42 is output through N-up printing in which multiple (N) pages of the original image data are merged into one page, and provided with sufficient margins where annotations can be written. The distribution material 42 is also provided with a file ID indicating the original image data or the printing image data created from the original image data and participant check boxes used for identifying who has written an annotation (S12).

During the conference, the user 40 may revise description in the distribution material 42 in their possession, make annotations for the purpose of taking notes, or mark the participant check box labeled the user's own name to generate the distribution material 46. Upon completion of the conference, or at an appropriate point during the conference, the user 40 scans the distribution material 46 using the scanner 18 to create input image data (S14).

The ID detector 20 reads the file ID from the input image data to detect a file name of corresponding printing image data and a page number in the file (S16). The document acquisition device 22 retrieves the printing image data from the document storage 36 based on detection results (S18). Then, the image differentiator 24 computes a difference between the printing image data and the input image data to generate difference image data (S20). The user detector 26 identifies the user who made the annotation from the marked status of the participant check box (S22).

The annotation extractor 28 extracts annotation data from the difference image data (S24), and then the floating type determination section 30 and the nondisclosure type determination section 32 determine a type of annotation based on geometries of the annotation. Classified annotation data is stored in the annotation storage 34 along with information to identify the user name, the printing image data for printing, or the like (S26).

The user 40 can review the stored annotation data as necessary by issuing an instruction through the front end 12. In this case, the back end 38 synthesizes an image from individual images in the original image data constituting the printing image data obtained from the document storage 36 and the annotation data stored in the annotation storage 34, and then displays the synthesized image on the front end 12 (S28).

Figure 3:
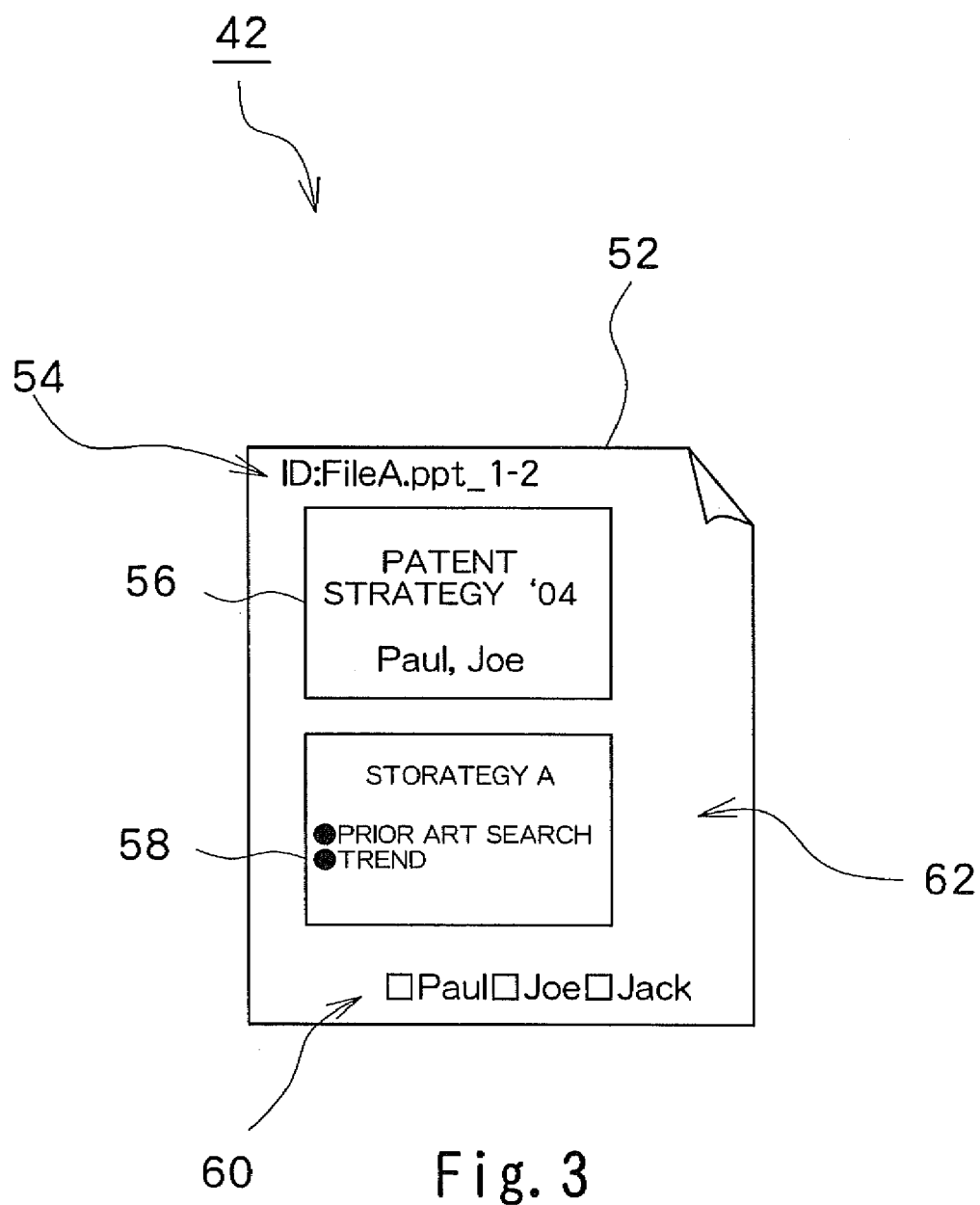
FIG. 3 shows an example of a printed distribution material.

Next, referring to FIGS. 3 to 11, the above operation will be described in detail using a specific example. FIG. 3 shows an example of the distribution material 42 depicted in FIG. 1. The distribution material 42 is created on a paper sheet 52. At the top of the paper sheet 52, a file ID 54 is represented as "FileA.ppt_1-2" which implies that the distribution material 42 is a printed output of the printing image data generated from "1-2" pages of the original image data identified by the file name "FileA.ppt". Further, on the paper sheet 52, presentation materials 56 and 58 corresponding to two pages of the original image data are 2-up printed, and participant check boxes 60 labeled with the names "Paul", "Joe", and "Jack" are provided at the bottom of the paper sheet 52. The margin 62 of the paper sheet 52 allocated on the right side is established in view of allowing sufficient writable space for annotations.

Figure 4:
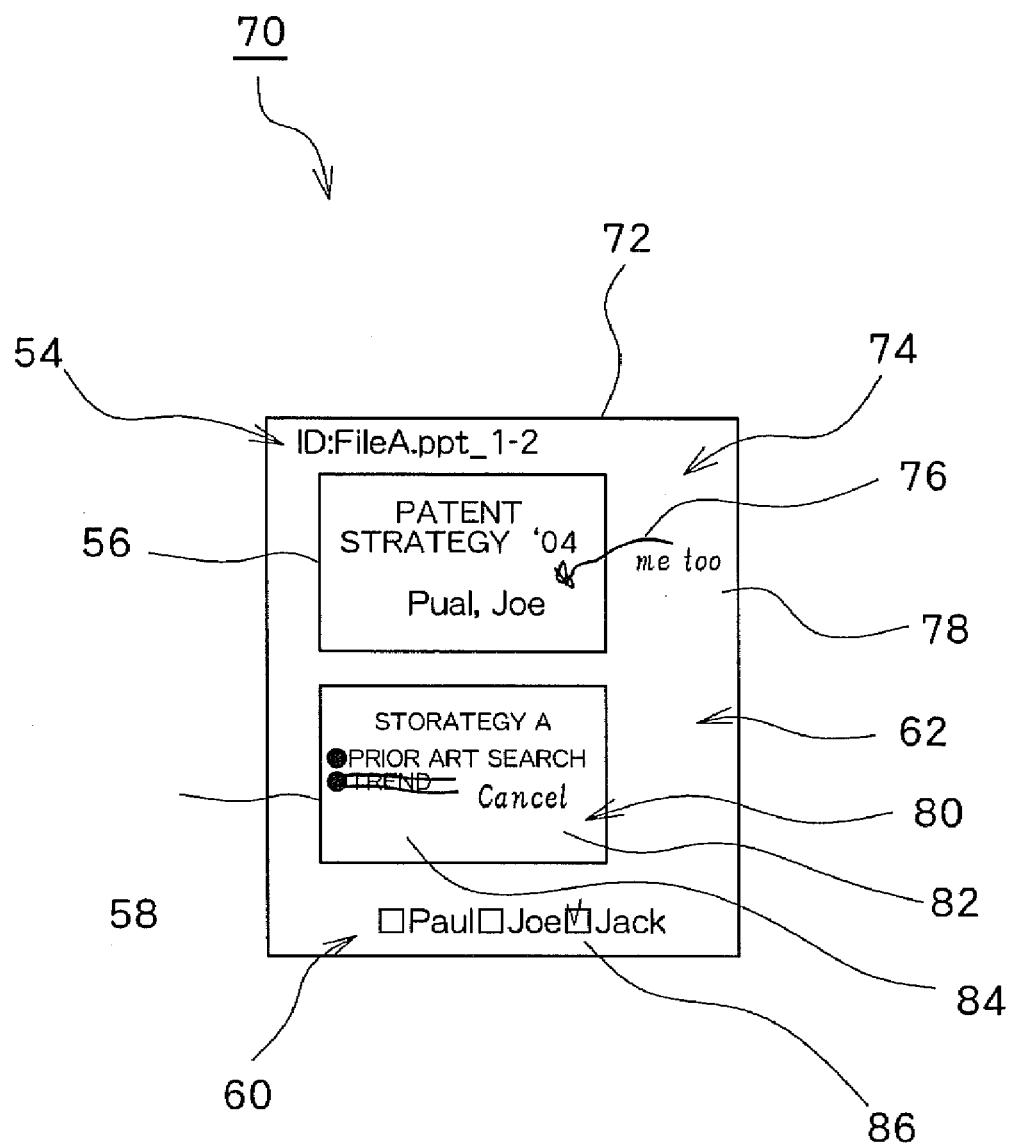
FIG. 4 shows an example of input image data generated through scanning.

FIG. 4 shows an image of input image data 70 created by reading the distribution material 42 depicted in FIG. 3 having annotations made thereon through the scanner 18. A paper area 72 of the input image data 70 contains data of the file ID 54, the presentation materials 56 and 58, and the participant check boxes 60.

The input image data 70 differs from the distribution material 42 depicted in FIG. 3 in that the input image data 70 has annotations 74 and 80 and a check mark 86 added thereto. The annotation 74 is configured with an indication line 76 extended from a last portion of name "Joe" in the presentation material 56 into the margin 62 and a handwritten text 78 "me too" (italics hereinafter representing a handwritten annotation) added on the margin 62. In other words, the annotation 74 has a description pointed out by an author of the annotation 74 and denoting that the author himself is not listed as a member of "Patent Strategies '04". On the other hand, the annotation 80 is configured with a revision line 84 which is a double line drawn over the description of "● Trends" and a handwritten text 82 of "cancel" written beside the revision line 84. In other words, the annotation 80 represents that a course of action associated with the "Trends" prepared as "Strategy A" is canceled as a decision of the conference. A check mark 86 is placed in a check box labeled "Jack", which indicates that this annotation is made by "Jack".

Figure 5:
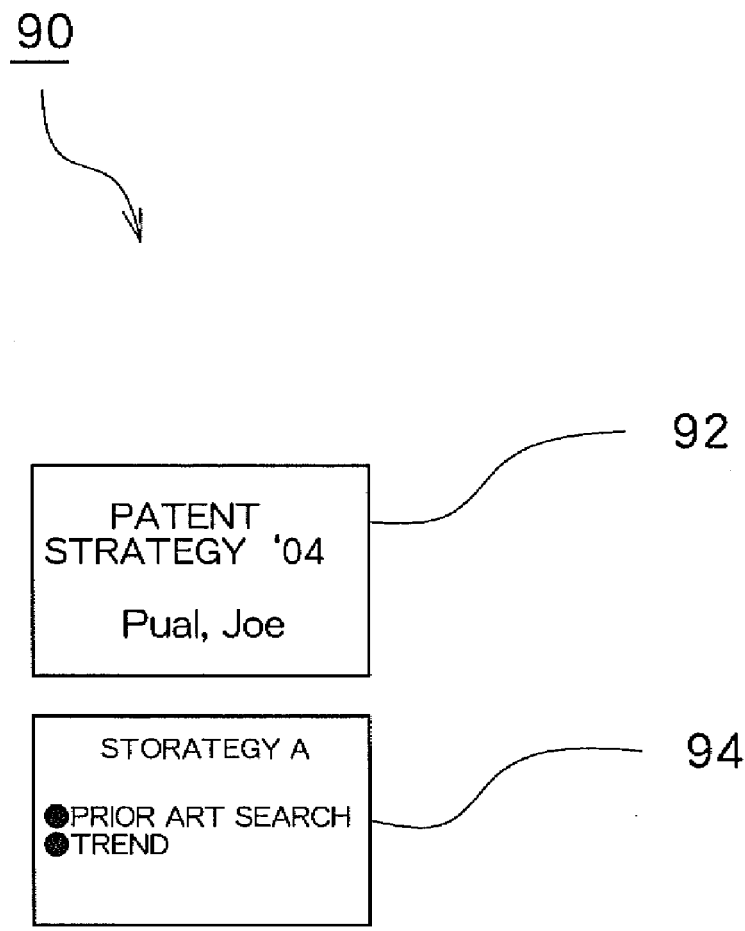
FIG. 5 shows an example of a set of original image data.

FIG. 5 shows a group of original image data 90 identified by the file ID 54. The document acquisition device 22 retrieves, based on the file ID 54, two original presentation materials 92 and 94 (or printing image data generated from a combination of the materials 92 and 94) used in printing of the distribution material 42 from the document storage 36. The original presentation materials 92 and 94 are data of images each corresponding to the presentation material 56 or 58.

Figure 6:
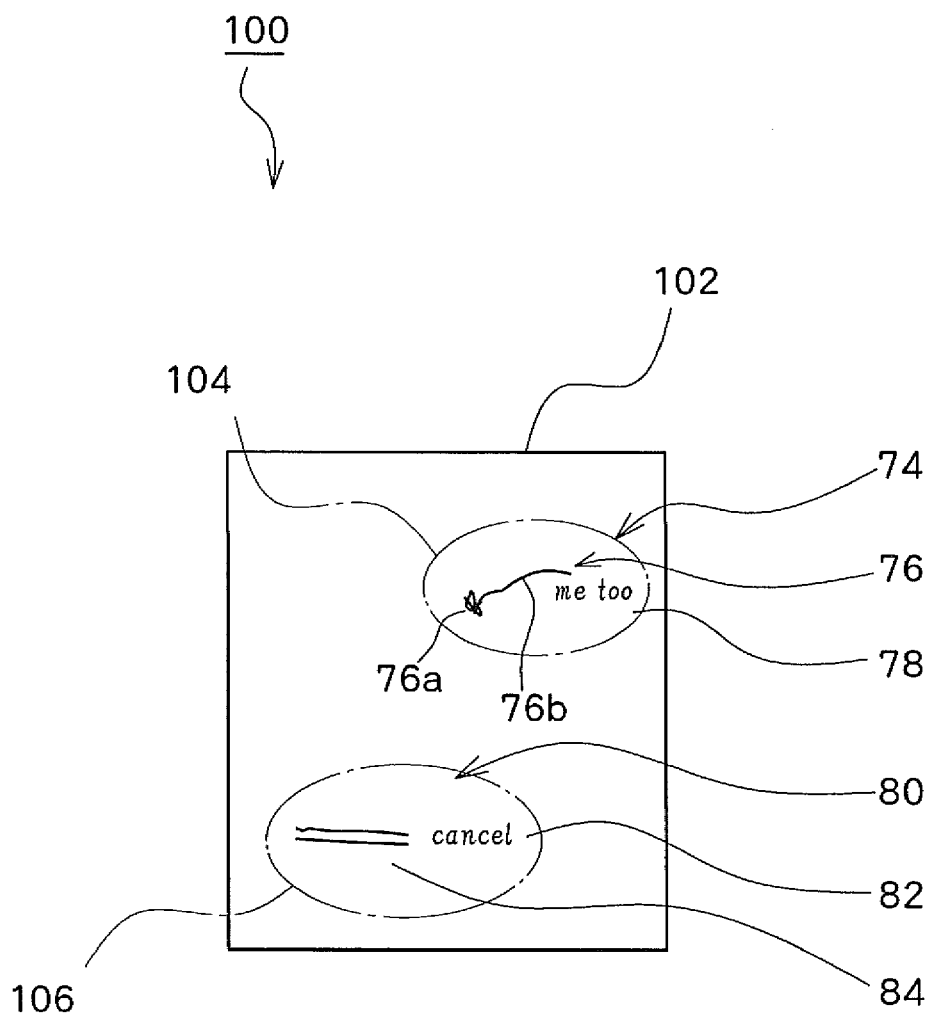
FIG. 6 shows an example of difference image data.

FIG. 6 shows an example of difference image data 100. The difference image data 100 is resultant image data obtained by subtracting the group of the original image data 90 shown in FIG. 5 from the input image data 70 shown in FIG. 4. More specifically, the annotation 74 configured with the indication line 76 and the text 78 and the annotation 80 configured with the text 82 and the revision line 84 are described in a paper area 102. The check mark 86 depicted in FIG. 4 is not contained in the difference image data because an area where the participant check boxes 60 are placed is not specified as a target of annotation extraction. However, the entire paper area 102 may, of course, be specified as the target of annotation extraction as appropriate.

The annotations 74 and 80 contained in the difference image data 100 are separated and classified by the annotation extractor 28. The annotations 74 and 80 are separated on the basis of a cluster of image patterns. Because each cluster 104 or 106 shown in FIG. 6 indicates an area containing an independent image pattern, separation is achieved by recognizing the cluster using image analysis. Discrimination as to whether or not the annotation in the cluster is a floating type is performed with reference to geometries. More specifically, the indication line 76 shown in FIG. 6 has a geometry formed by a combination pattern of a solid circle 76*a* pointing at a specific place, a leader line 76*b* extended from the solid circle 76*a*, and the text 78 placed in the vicinity of the leader line 76*b*, and therefore the indication line 76 is determined to be floating type from the geometry.

Figure 7:
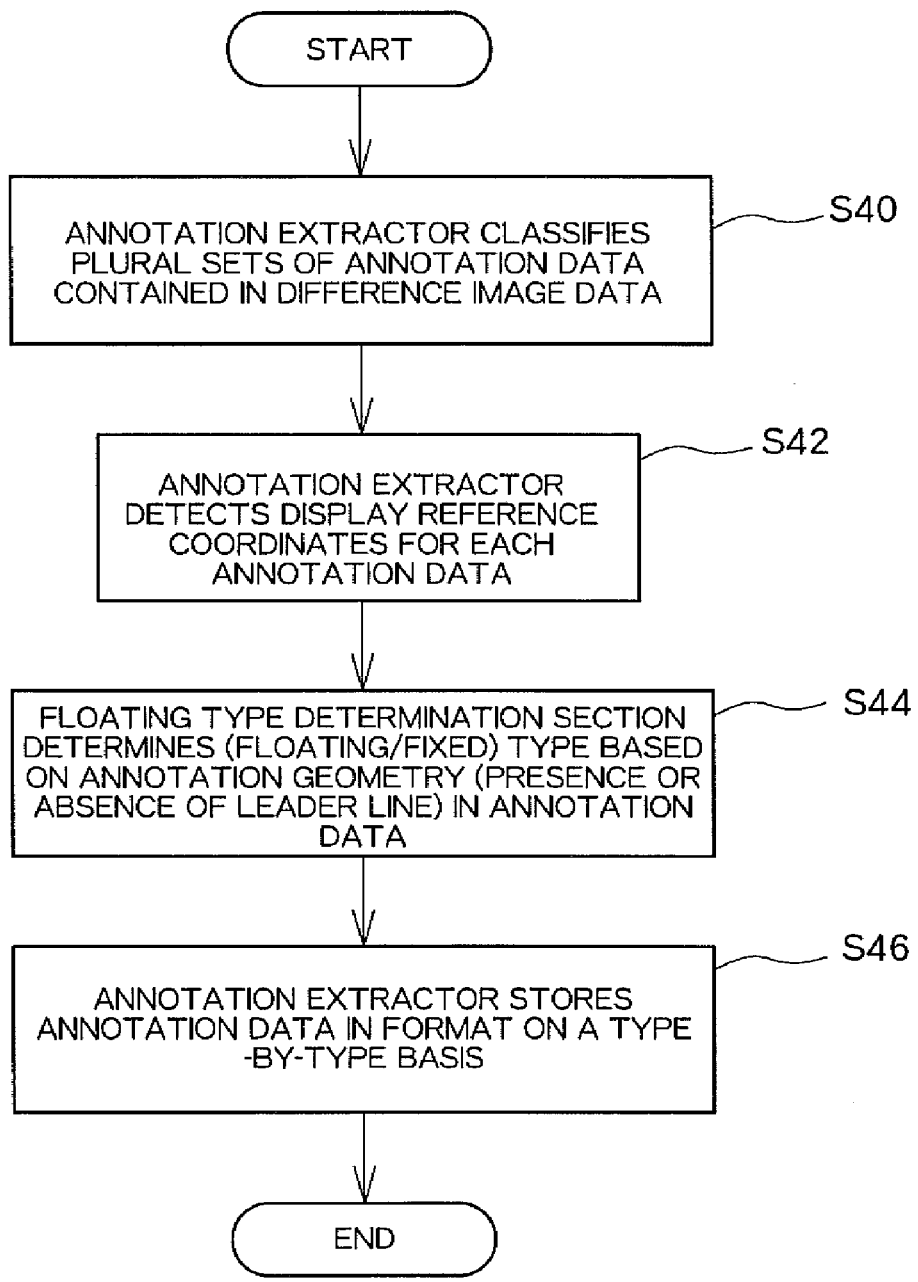
FIG. 7 is a flowchart depicting a process of extracting annotation data.

FIG. 7 is a flowchart for explaining detailed operation of the annotation extractor 28. The annotation extractor 28 extracts the clusters 104 and 106 depicted in FIG. 6 to achieve separation between plural sets of annotation data contained in the difference image data 100 (S40). Then, display reference coordinates for locating a display position of annotation data are detected for each set of the annotation data extracted (S42).

Subsequently, the floating type determination section determines whether the annotation data is the floating type or the fixed type for each set of annotation data (S44). In this determination, an annotation in which a remark is made with indication of a specific place (or area) is detected based on whether or not the annotation has a predetermined geometry. For example, it can be said that the combination of the solid circle 76*a* pointing at the specific place, the leader line 76*b* extended from the solid circle 76*a*, and the text 78 placed in the vicinity of the leader line 76*b* in the annotation 74 of FIG. 6 represents that the text 78 is a remark about a matter pointed by the solid circle 76*a*. Accordingly, by defining such a geometry as a judgment criterion, the annotation 74 is classified as floating type. The annotation 80, on the other hand, could possibly be determined to be the floating type with an indication of an area pointed by the revision line 84. In this example, however, the indication pointed by the revision line 84 is not defined as a judgment criterion, thereby assuming that the annotation 80 should be classified as the fixed type. The groups of annotation data classified are stored in the annotation storage 34 in accordance with classification categories (S46).

Figure 8:
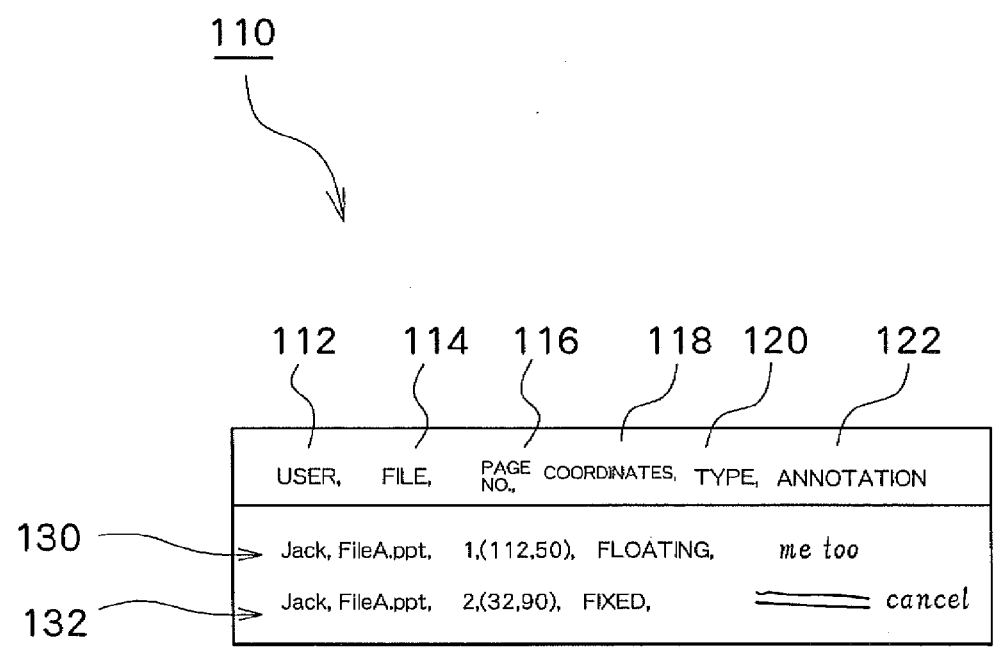
FIG. 8 shows an example of stored annotation data.

FIG. 8 shows stored annotation data 110 entered in the annotation storage 34. The stored annotation data 110 is stored in a state organized into multiple fields. In the example of FIG. 8, there are provided a user field 112, a file field 114, a page field 116, a coordinate field 118, a type field 120, and an annotation field 112, and each item of two groups of data 130 and 132 are stored in the corresponding field. For the group of data 130, for example, items denoting that writing is made by "Jack", that writing is performed in connection of the original image data contained on Page "1" in file "FileA.ppt", that a written position is located at reference coordinates "(112,50)", and that writing is classified as "floating" type are stored. In addition, image data corresponding to the "me too" entered in the annotation field 122 is stored in a separate file associated with the annotation field 122. The image data of the annotation field 122 does not include the indication line 76 because, in display operation, a pattern which indicates the specific place will be used in stead of the indication line 76. The group of data 132 is similarly stored except that the group of data 132 is classified as "fixed" type, and that image data stored in the annotation field 122 contains additional symbolic representation other than characters of "==" in "==cancel" as shown in FIG. 8.

Figure 9:
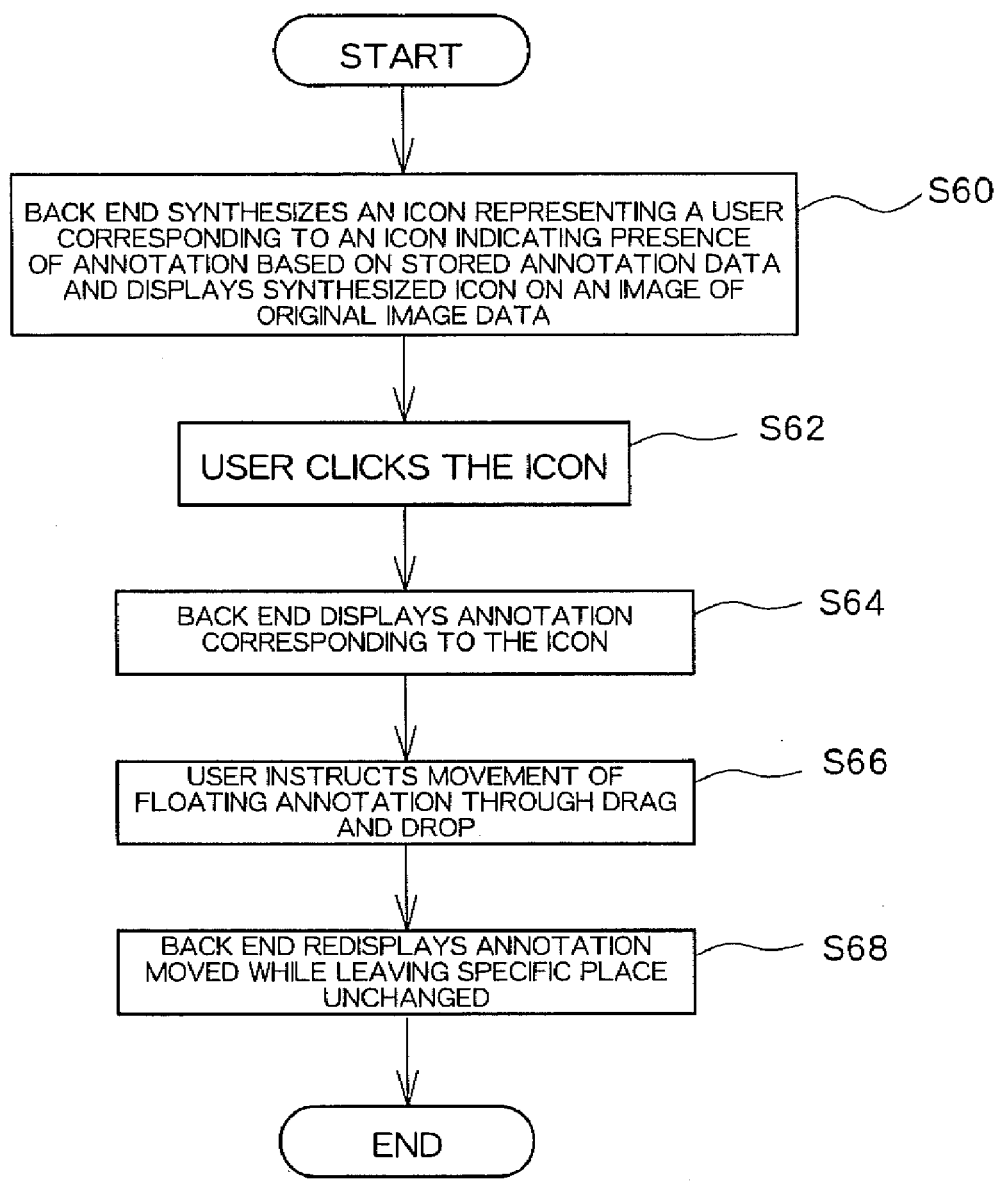
FIG. 9 is a flowchart depicting a process of displaying an annotation.

FIG. 9 is a flowchart of display operation performed by the back end 38. In response to an instruction for display operation sent from the front end 12, the back end 38 reads the original image data being an object to be displayed from the document storage 36 and refers to the stored annotation data 110 to retrieve annotation data attached to the original image data. Then, the back end 38 superimposes an icon which indicates the presence of an annotation and an icon which indicates a user being an author of the annotation on an image based on the original image data and displays a resulting superimposed image on the front end 12 (S60).

A user wishing to view the annotation corresponding to the icon can do so by clicking on that icon (S62). Responding to the click, the back end 38 displays the corresponding annotation in place of the icon (S64). The user can give an instruction for movement of the annotation through drag-and-drop operation (S66). In this case, when the annotation subjected to the movement is floating type, the back end 38 moves only written text or the like while leaving the specific place designated by the annotation unchanged (S68).

Figure 10A:
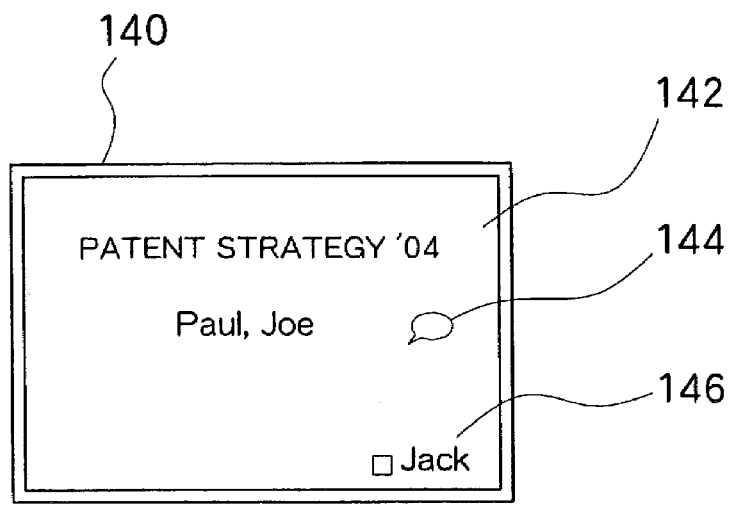
FIGS. 10A and 10B show display formats of an annotation of a floating type.
Figure 10B:
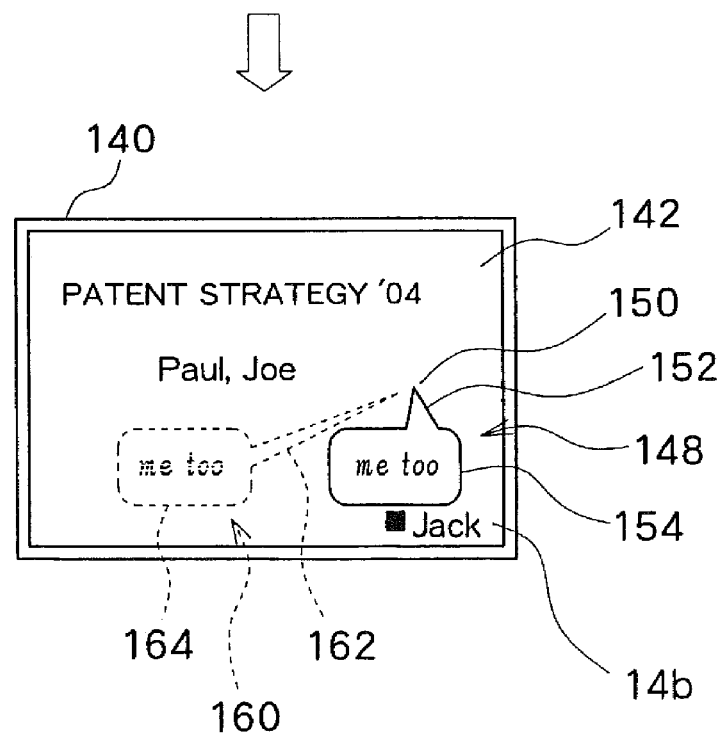

FIGS. 10A and 10B show display examples of the annotation of floating type. In FIG. 10A, an image of the presentation material 142 is shown on a display screen 140 with an annotation view icon 144 and user view icon 146 superimposed on the image. The two icons denote the presence of an annotation written by "Jack". When a user clicks the annotation view icon 144 on the display screen 140 illustrated in FIG. 10A, a view depicted in FIG. 10B is displayed.

In FIG. 10B, an annotation 148 is displayed in place of the annotation view icon 144, and a check mark is entered in the check box of the user view icon 146 to indicate that the annotation 148 is written by "Jack". The annotation 148 is superimposed and displayed on a blank area of the presentation material 142. Although the original annotation 74 shown in FIG. 4 is configured with the text 78 placed on the margin 62, the text 78 is relocated on the presentation material 42 because the written text on the margin 62 is out of a display region. In addition, the annotation 148 is configured with a pointer portion 152 to indicate a specific place 150 and a text display portion 154 in which written text "me too" is included. In other words, instead of the indication line 76 pointing at the specific place in the original annotation 74 shown in FIG. 4, the pointing portion 152 formed by a predetermined arrow-shaped pattern is used to indicate the specific place 150. Thus, in spite of relocation of the annotation 148 from the original position, the specific place 150 identical to the original position can be indicated.

When the annotation 148 of floating type is thus displayed, movement according to a user's instruction can be easily performed. Even though a user moves the annotation 148 to obtain an annotation 160 as shown by a dashed line in FIG. 10B, the pointer portion 162 continues to indicate the specific place 150 originally established while allowing movement of the text display portion 164 as instructed by the user. Accordingly, which matter is noted by the moved annotation 160 can still be recognized appropriately.

Figure 11A:
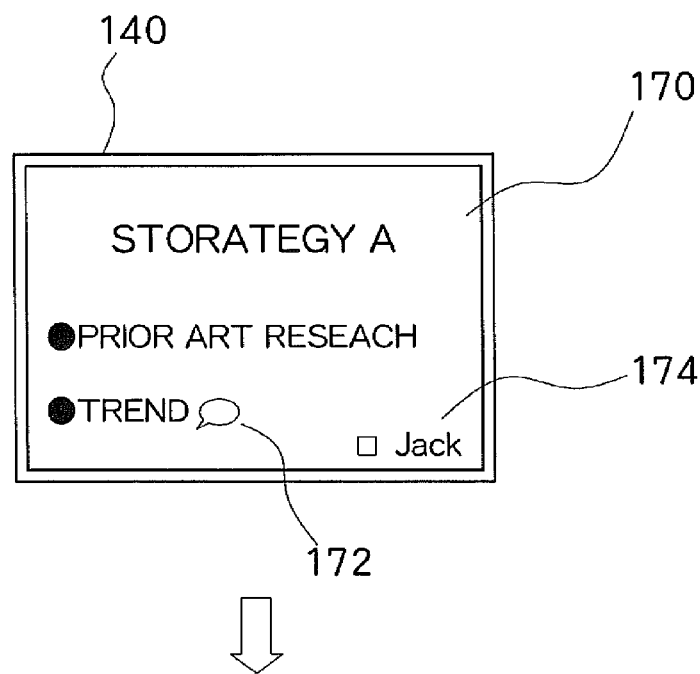
FIGS. 11A and 11B show display formats of an annotation of a fixed type.
Figure 11B:
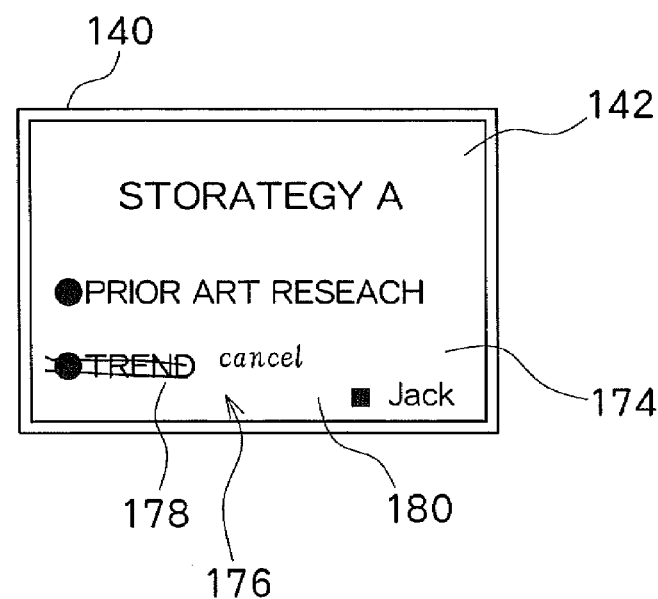

FIGS. 11A and 11B show display examples of an annotation of fixed type. In FIG. 11A, similarly with FIG. 10A, an image of the presentation material 170 is shown on a display screen 140 with an annotation view icon 172 and user view icon 174 superimposed on the image.

FIG. 11B shows a view displayed when the annotation view icon 172 illustrated in FIG. 11A is clicked. Then, in place of the annotation view icon 172, an annotation 176 is displayed, and a check mark is entered in the check box of the user view icon 174 to indicate that the annotation 176 displayed is written by "Jack". Because the annotation 176 is of fixed type and initially placed within the presentation material 170, the annotation 176 is placed at the same location in the same form as with the annotation 80 depicted in FIG. 6.

Figure 12A:
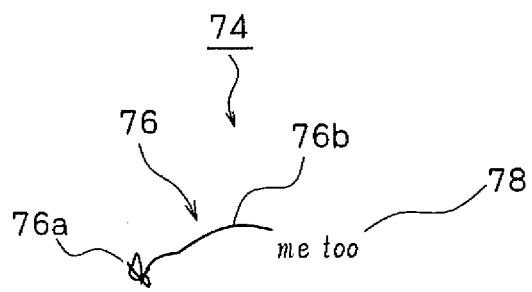
FIGS. 12A to 12C show geometries of an annotation classified as a floating type.
Figure 12B:
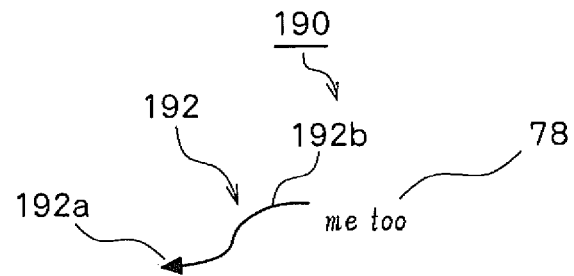
Figure 12C:
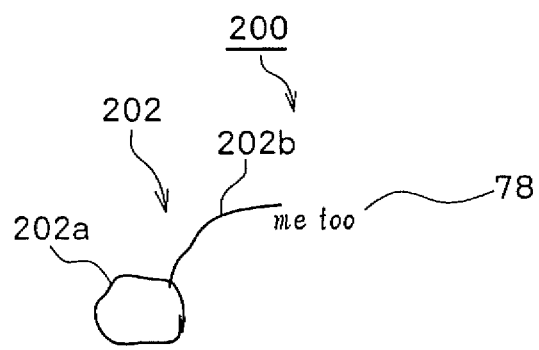

Referring to FIG. 12, examples of the annotation classified as floating type will be described below. The annotation 74 shown in FIG. 12A is the annotation described in connection with FIG. 6, and configured, as described above, with the indication line 76 having the solid circle 76*a* to indicate a specific place and the leader line 76*b*, and the text 78. An annotation 190 illustrated in FIG. 12B is an example of a typical annotation classified as floating type. The annotation 190 is configured with an arrow 192 having an arrow head 192*a* and a leader line 192*b*, and the text 78. In this example, the text 78 is obviously a remark about a matter at the specific place indicated by the arrow head 192*a*, and is usually handled as the floating type. It should be noted that when the arrow head 192*a* is attached on the text 78 side, the annotation 190 is usually determined to be floating type. An annotation 200 illustrated in FIG. 12C is an example of the annotation of floating type which indicates a specific region rather than a specific point. The annotation 200 is configured with an indication line 202 including a circular enclosure 202*a* and a leader line 202*b* extended from the circular enclosure 202*a*, and the text 78 placed at an open other end of the leader line 202*b*. Accordingly, the annotation 200 is usually regarded as floating type which indicates a specific place with the circular enclosure 202*a*.

The user may determine a pattern established as a judgment criterion as appropriate. Further, to facilitate utilization of the annotation of floating type, it is particularly preferable that a person who makes an annotation be aware of the judgment criterion used for classification.

Lastly, referring to FIG. 13, nondisclosure determination performed by the nondisclosure determination section 32 will be described. In nondisclosure determination, written annotations are discriminated between an annotation which can be disclosed to another user and an annotation for which disclosure to other users is prohibited. The user can impart a geometry which specifies nondisclosure (disclosure) of the annotation according to judgment criteria to the annotation that the user wishes (or does not wish) to disclose, to achieve nondisclosure (disclosure) of the annotation.

Figure 13A:
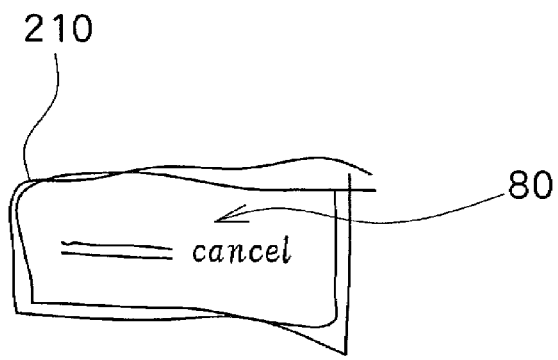
FIGS. 13A and 13B show geometries of an annotation classified as a nondisclosure type.
Figure 13B:
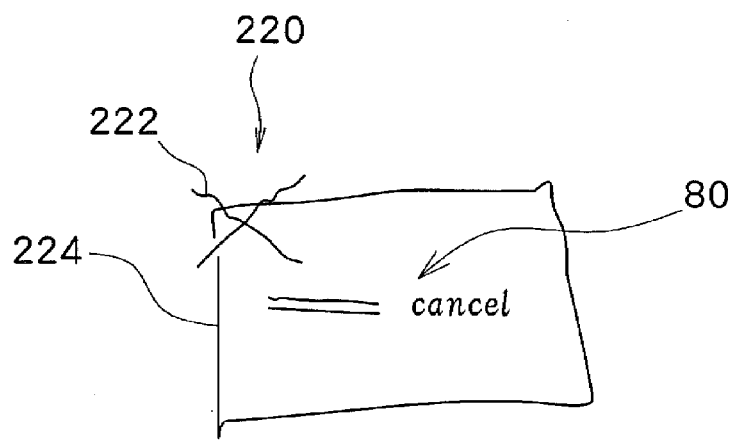

FIGS. 13A and 13B are examples of the geometry which specifies nondisclosure. In FIG. 13A, an ordinary annotation 80 is enclosed within a rectangular annotation 210 formed in the shape of double box. Upon detection of the rectangular annotation 210 in the shape of double box, the nondisclosure determination section 32 determines that the annotation 80 within the rectangular annotation 210 is not an object to be disclosed. In FIG. 13B, the ordinary annotation 80 is surrounded by an annotation 220 configured with a single box 224 and a small cross 222 placed at an upper left corner of the single box 224. Upon detection of the annotation 220, the nondisclosure determination section 32 also determines that the inner annotation 80 is not an object to be disclosed.

According to the above-described embodiment, the annotations personally written on documents at a conference can be managed in a centralized manner by the computer system 10. In this manner, participants can, for example, make remarks about a presenter's statement while displaying their own handwritten annotations. Further, when reviewing the conference, it is possible to view the annotations made by the participants along with the presentation material. Still further, the annotations made by the participants may be handled just like a reply to questionnaires, which makes it possible to gather opinions of the participants.

Although the above embodiment was described in connection with a conventional conference, in addition to such a conventional conference held at one place where all the participants gather, this invention may be advantageously applied to another type of conference implemented by connecting multiple sites where a part of participants are gathered through communication equipment, i.e. teleconference. In this case, by distributing printers and scanners to the sites, effects similar to those obtained in the conventional conference can be produced.

Next, various modifications of the embodiment of the present invention will be described.

In one embodiment of the present invention, whether or not the annotation contained in the handwritten annotation data includes a geometry which points to a specific place in an image according to the input image data is determined in the classification procedure. When the geometry is included, the handwritten annotation data is classified as the floating type, and specific place data representing position information of the specific place is generated. In other words, whether or not a shape pattern which points at a particular range or a particular point in the image generated from the input image data is contained is determined. Then, when the shape patters is contained, the annotation data is classified into a category which is tentatively designated as "floating type", and the specific place data representing position information regarding the range or the point of the specific place is generated. The "floating type" annotation has a characteristic that it is described in connection with the specific place. Accordingly, in a subsequent process, such as a display process, a storing process, an analysis process, or the like, instead of being collectively processed, the annotations are preferably handled individually in consideration of whether or not to be "floating type". Technology according to this embodiment enables such individual handling of the annotations.

In another embodiment of the present invention, the computer is instructed to perform a display procedure for displaying an annotation contained in the handwritten annotation data determined to be a floating type on an image according to the reference image data. In the display procedure, after moving a written position of the annotation from an originally written position to a position where the annotation can be displayed in part or in entirely and generating graphic representation for linking the annotation to the specific place based on the specific place data, the annotation is displayed at the written position along with the graphic representation. The graphic representation for linking to the specific place is typically a line pattern, such as a strait line, a curved line, an arrow, or the like, which continuously connects the annotation to the specific place. Under circumstances where a risk of causing confusion is low, for example, when the annotations to be displayed are small in number, the annotation and the specific place may advantageously be linked based on a common pattern, such as a common color, a common symbol, or the like, assigned to both of them.

In still another embodiment of the present invention, an annotation obtained by removing a geometry which points at a specific place from the original annotation is displayed in the display procedure. More specifically, when displaying the annotation whose written position is changed, the geometry originally given to indicate the specific place becomes unnecessary. Therefore, the geometry is removed to improve legibility.

In one embodiment of the present invention, in the display procedure, when the originally written position is out of a display range of the image according to the reference image data, after relocating the written position into the display range, the annotation is displayed at the relocated written position. Examples of the state in which the originally written position is out of the display range includes a case where a paper sheet from which the input image data is captured has a large writable area in the margin of the sheet in which annotations are added, and a case where the paper sheet from which the input image data is captured includes N-up printed multiple pages with annotations written at the outside of the pages. It should be noted that, in this embodiment, the specific place is assumed to be present within the display range.

According to another embodiment of the present invention, in the display procedure, when originally written positions of the annotations contained in plural sets of the handwritten annotation data overlap, the annotation is displayed after relocating the original written position of at least one of the annotations so as to prevent the annotation from overlapping. The presence or absence of overlap can be detected by comparing the written positions. Such an overlap could be introduced, for example, when the handwritten annotations contained in different sets of the input image data independently created are simultaneously displayed.

According to still another embodiment of the present invention, in the display procedure, when the originally written position overlaps a non-blank area in the image according to the reference image data, the annotation is displayed after setting the written position to a position where the written position is prevented from overlapping the non-blank area. This embodiment can be implemented by finding the presence or absence of the overlap through detection of the non-blank area (or blank area) in the image according to the reference image data.

According to another embodiment of the present invention, in the display procedure, upon acceptance of an instruction for movement of a display position of the annotation input by a user, the annotation is redisplayed at an instructed position, along with a new graphic representation which links the redisplayed annotation with the specific place. In other words, when a user drags the annotation having been already displayed to another location using input means, such as a mouse, the displayed view is regenerated to maintain the connection to the specific place.

According to yet another embodiment of the present invention, in the classification procedure, classification is performed based on a judgment as to whether or not the annotation contained in the handwritten annotation data includes a geometry which indicates permission or nonpermission of disclosure of the annotation. This judgment can be formed by presetting a discrimination pattern for the geometry representing permission (nonpermission) of disclosure. A person who attempts to make a handwritten annotation is requested to perform writing according to the discrimination pattern, to thereby enable control of the permission/nonpermission of disclosure. For the annotation classified into the category of nonpermission, processing for inhibiting disclosure is performed. An example of a very simple processing is data deletion. Alternatively, information on a user who owns the input image data associated with the undisclosed annotation may be acquired to grant an access right only to the user. According to this embodiment, both protection of individual's privacy and convenience in sharing information can be secured.

In still another embodiment of the present invention, the computer is instructed to further perform a function comprising the steps of a user identification procedure for identifying a user who has made the annotation based on a result of image processing of the input image data, a storage procedure for, after associating a part or the whole of the handwritten annotation data classified in the classification procedure with the user identified in the user identification procedure, storing the handwritten annotation data in association with the user, and a user view procedure for accepting a designation of a user who is associated with the annotation which is an object of display through user input, and then displaying or not displaying the annotation according to the handwritten annotation data stored in association with the user. Although the user identification procedure can effectively lighten an operator's workload by automatic user identification achieved through image processing, the user identification may be performed by, for example, manually accepting a user name from operator's input when desirable or when the increased workload is not overly burdensome. Further, this embodiment is also effective even when the classification procedure is not performed.

In any of the above-described embodiments, the computer may be configured with hardware such as a personal computer capable of performing computations, while the program may be software which controls the computer to instruct the computer to execute a predetermined procedure. The recording medium may be, for example, a DVD (Digital Versatile Disc), a CD (Compact Disc), a floppy disk, a semiconductor memory, a hard disc, or the like, in which the program is stored.

During the extraction procedure, input image data may be compared with reference image data. The input image data is image data presumed to include a handwritten annotation and typically generated by scanning a paper document. Although the input image data is generally described in a raster format, the data may be described in another image format, such as a vector format, through format conversion. Because the reference image data is image data including no handwritten annotation (or handled as image data without handwritten annotation), for example, image data used for generating a paper sheet according to the input image data, or image data generated by scanning a paper sheet on which no handwritten annotation is made may be used. Similarly with the input image data, the format of description of the reference image data is not limited to a specific format. When the handwritten annotation data is extracted by differentiating between the input image data and the reference image data, as described above, processings, such as alignment of comparative positions, noise reduction, and so on may be performed as appropriate.

In the classification procedure, annotation geometries represented by the extracted handwritten annotation data may be discriminated. Because the annotation geometries refer to a pattern represented by shapes and colors of entities, such as characters, graphical objects, or symbols, contained in the annotation, the annotation geometries may be discriminated through processing, such as image pattern recognition, or the like. In such a recognition process, at least characteristic patterns in the annotation are discriminated and classified into plural categories according to a predetermined criterion. The handwritten annotation data classified may be partially or entirely stored in the computer or an external storage device.

In the above-described embodiment, the handwritten annotation is extracted from the input image data and classified into at least two categories. Through various settings of classification criteria, discrimination between an annotation being an object to be displayed, stored, and analyzed and other annotations can be achieved, and an individual display format, storage format, and analysis type can be specified for the annotation. In this manner, for example, in the presence of a great number of handwritten annotations, the handwritten annotations can easily be handled in processings, such as display processing, storage processing, or analysis processing, and legible and visible display of the handwritten annotations can be realized.

Having described the invention as related to the embodiments, it is to be understood that the invention is not limited to the specific embodiments but may be otherwise variously embodied within the scope of the following claims.

The entire disclosure of Japanese Patent Application No. 2005-093470 filed on Mar. 29, 2005 including the specification, claims, drawings, and abstract is incorporated herein by reference.

What is claimed is:

1. A storage medium readable by a computer, the storage medium storing a program of instructions executable by the computer to perform a function comprising:

from a reading unit that reads a printed material including an image according to a reference image data, a margin, and a handwritten annotation, acquiring input image data indicating a result of reading;

comparing the input image data with the reference image data;

extracting handwritten annotation data representing the handwritten annotation contained in the input image data based on a result of comparing;

discriminating a location of the handwritten annotation within the input image data with respect to predetermined areas within the input image data;

classifying the extracted handwritten annotation data according to the location of the handwritten annotation within the input image data with respect to predetermined areas within the input image data, wherein the classifying includes determining whether or not the handwritten annotation according to the extracted handwritten annotation data includes a geometry which points to a specific place in the input image data, and when the geometry is included, the handwritten annotation data is classified as a floating type, and specific place data, which represents position information of the specific place, is generated;

classifying the extracted handwritten annotation based on whether the handwritten annotation according to the extracted handwritten annotation data includes a predetermined geometry that indicates permission or non-permission of disclosure of the handwritten annotation; and displaying the handwritten annotation, when the extracted handwritten annotation data includes the pre-determined geometry that indicates permission of disclosure of the handwritten annotation, according to the handwritten annotation data classified as the floating type on an image according to the reference image data, wherein if the location of the handwritten annotation in the input image data is within the margin, the location of the handwritten annotation according to the extracted handwritten annotation data determined as the floating type is relocated to a position within a display range of the image according to the reference image data, and the handwritten annotation is linked with the specific place according to the specific place data.

2. The storage medium according to claim 1, wherein handwritten annotation obtained by removing the location pointing at the specific place from the original handwritten annotation is displayed.

3. The storage medium according to claim 1, wherein, when the originally written positions of a plurality of the handwritten annotations overlap, at least one of the handwritten annotations is displayed at a relocated position which does not overlap other handwritten annotation.

4. The storage medium according to claim 1, wherein, when the originally written position of the handwritten annotation overlaps a non-blank area in the reference image data, the handwritten annotation is displayed at a relocated position which does not overlap the non-blank area.

5. The storage medium according to claim 1, wherein, upon acceptance of an instruction for movement of a display position of the handwritten annotation input by a user, the handwritten annotation is redisplayed at an instructed position, along with a new graphic representation which links the redisplayed handwritten annotation with the specific place.

6. The storage medium according to claim 1, the function further comprising:

identifying a user who has made the handwritten annotation;

storing the handwritten annotation in association with the identified user;

accepting a designation of a user who is associated with the handwritten annotation which is an object of display through user input; and displaying the handwritten annotation stored in association with the user.

7. An annotation data processing apparatus comprising:
a reading unit that reads a printed distribution material including a reference image data, a margin, and a handwritten annotation;
a comparing unit that compares the input image data with the reference image data;
an extractor that extracts handwritten annotation data representing the handwritten annotation contained in the input image data based on a result of comparing;
a classification unit that classifies the extracted handwritten annotation data according to the location of the handwritten annotation wherein said classification unit determines whether or not the handwritten annotation according to the extracted handwritten annotation data includes a geometry which points to a specific place in the input image data, and, when it is determined that the geometry is included, the handwritten annotation data is classified as a floating type and specific place data which represents position information of the specific place is generated;
said classification unit classifying the extracted handwritten annotation based on whether the handwritten annotation according to the extracted handwritten annotation data includes a pre-determined geometry that indicates permission or non-permission of disclosure of the handwritten annotation; and
a display unit that displays the handwritten annotation, when the extracted handwritten annotation data includes the pre-determined geometry that indicates permission of disclosure of the handwritten annotation, according to the handwritten annotation data classified as the floating type on an image according to the reference image data, wherein, when the location of the handwritten annotation in the input image data is within the margin, the location of the handwritten annotation according to the extracted handwritten annotation data determined as the floating type is relocated to a position within a display range of the image according to the reference image data and the handwritten annotation is linked with the specific place according to the specific place data.

8. The annotation data processing apparatus according to claim 7, further comprising:
an identification unit that identifies a user who has made the handwritten annotation;
a storage in which the handwritten annotation is stored in association with the identified user;
an accepting unit that accepts a designation of a user who is associated with the handwritten annotation which is an object of display through user input; and
a display that displays the handwritten annotation stored in association with the user.

9. An annotation data processing method executable by a computer comprising:
from a reading unit that reads a printed material including an image according to a reference image data, a margin, and a handwritten annotation, acquiring input image data indicating a result of reading;
comparing the input image data with the reference image data;
extracting handwritten annotation data representing the handwritten annotation contained in the input image data based on a result of comparing;
discriminating a location of the handwritten annotation within the input image data with respect to predetermined areas within the input image data;
classifying the extracted handwritten annotation data according to the location of the handwritten annotation within the input image data with respect to predetermined areas within the input image data, wherein the classifying includes determining whether or not the handwritten annotation according to the extracted handwritten annotation data includes a geometry which points to a specific place in the input image data, and when the geometry is included, the handwritten annotation data is classified as a floating type, and specific place data, which represents position information of the specific place, is generated;
classifying the extracted handwritten annotation based on whether the handwritten annotation according to the extracted handwritten annotation data includes a pre-determined geometry that indicates permission or non-permission of disclosure of the handwritten annotation; and
displaying the handwritten annotation, when the extracted handwritten annotation data includes the pre-determined geometry that indicates permission of disclosure of the handwritten annotation, according to the handwritten annotation data classified as the floating type on an image according to the reference image data, wherein if the location of the handwritten annotation in the input image data is within the margin, the location of the handwritten annotation according to the extracted handwritten annotation data determined as the floating type is relocated to a position within a display range of the image according to the reference image data, and the handwritten annotation is linked with the specific place according to the specific place data.

10. The annotation data processing method according to claim 9, further comprising:
identifying a user who has made the handwritten annotation;
storing the handwritten annotation in association with the identified user;
accepting a designation of a user who is associated with the handwritten annotation which is an object of display through user input; and
displaying the handwritten annotation stored in association with the user.

* * * * *